Oct. 18, 1949.  W. J. COTTON  2,485,478
METHOD OF ELECTROCHEMICALLY PRODUCING NITROGEN
OXIDE IN THE PRESENCE OF TANTALUM ELECTRODES
Filed Dec. 9, 1947  5 Sheets-Sheet 1
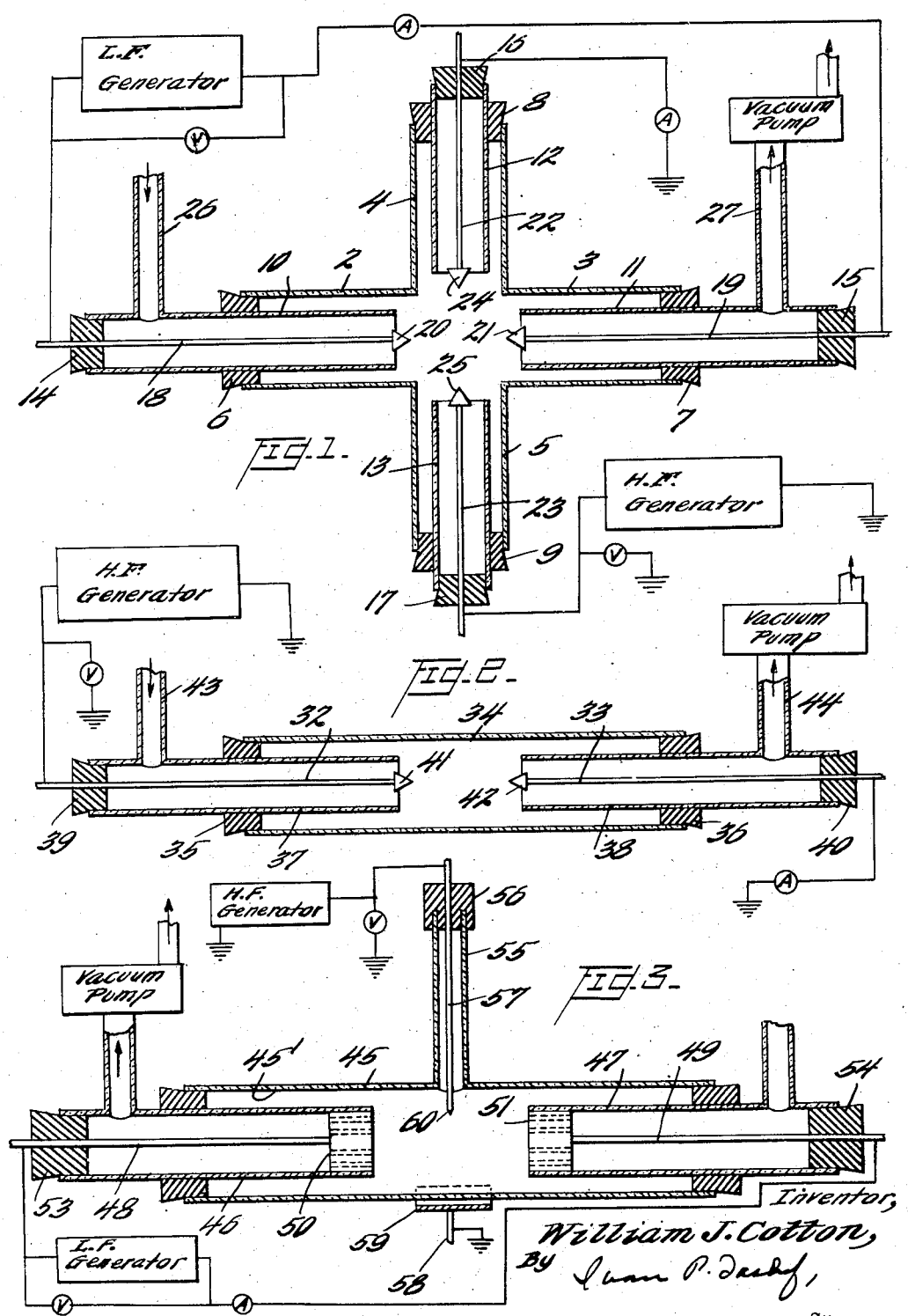
Inventor,
William J. Cotton,
By [signature]
Attorney

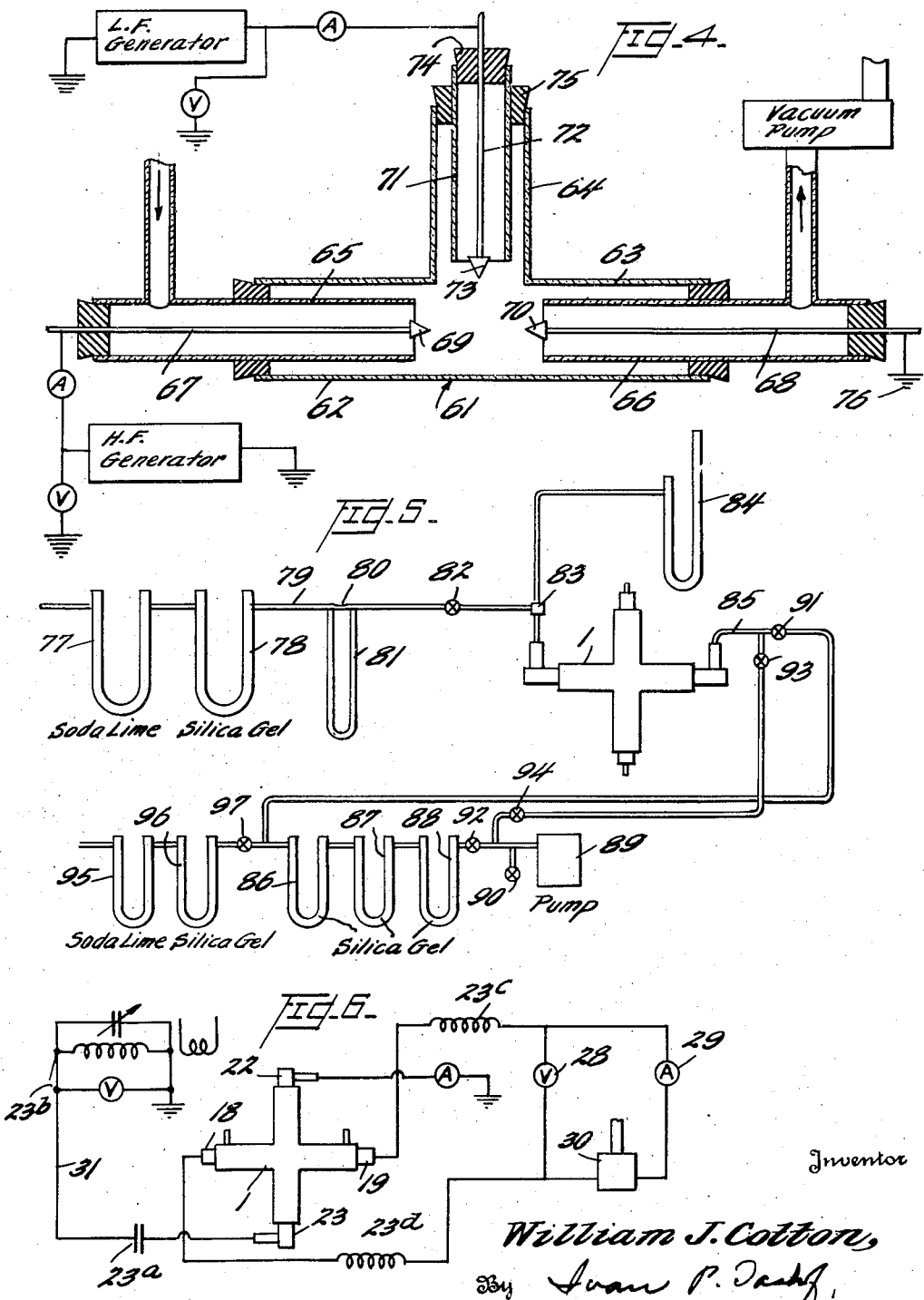

Oct. 18, 1949.  W. J. COTTON  2,485,478
METHOD OF ELECTROCHEMICALLY PRODUCING NITROGEN
OXIDE IN THE PRESENCE OF TANTALUM ELECTRODES
Filed Dec. 9, 1947  5 Sheets-Sheet 3
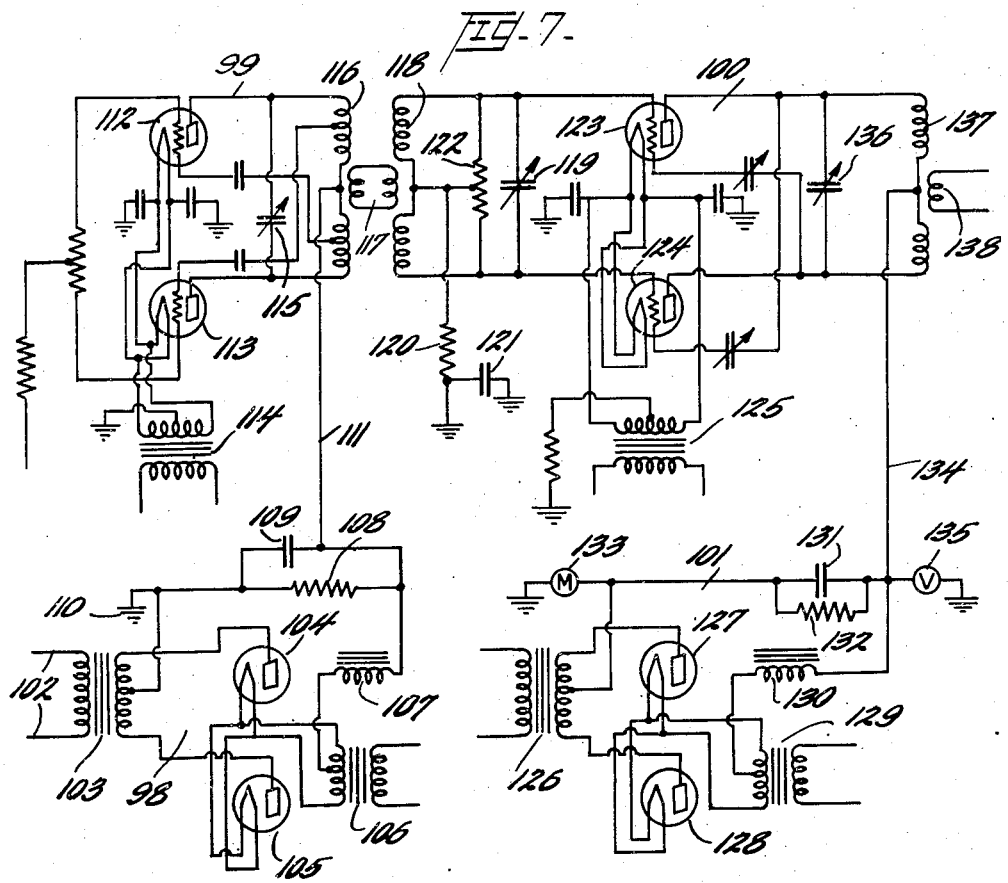
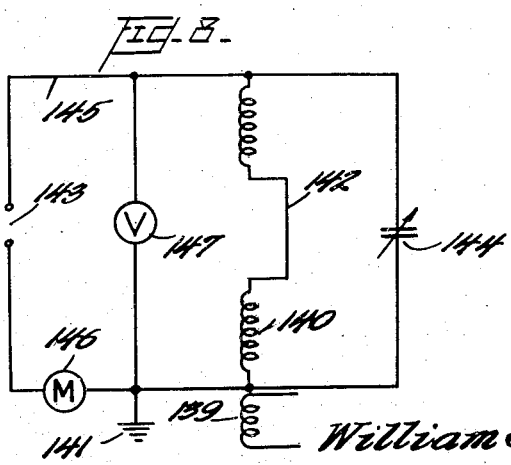
Inventor
William J. Cotton
By Ivan P. Tashof
Attorney

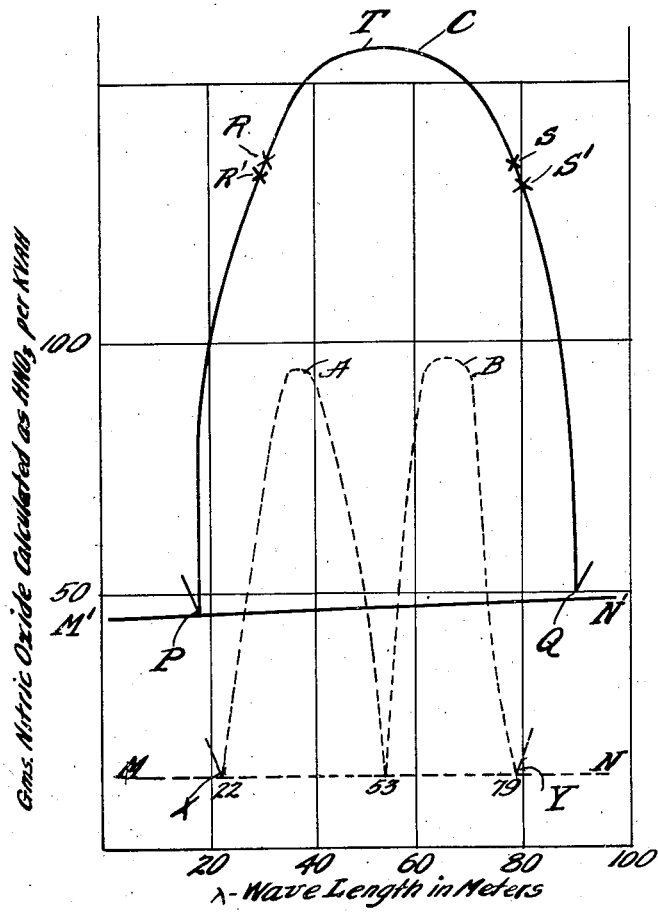

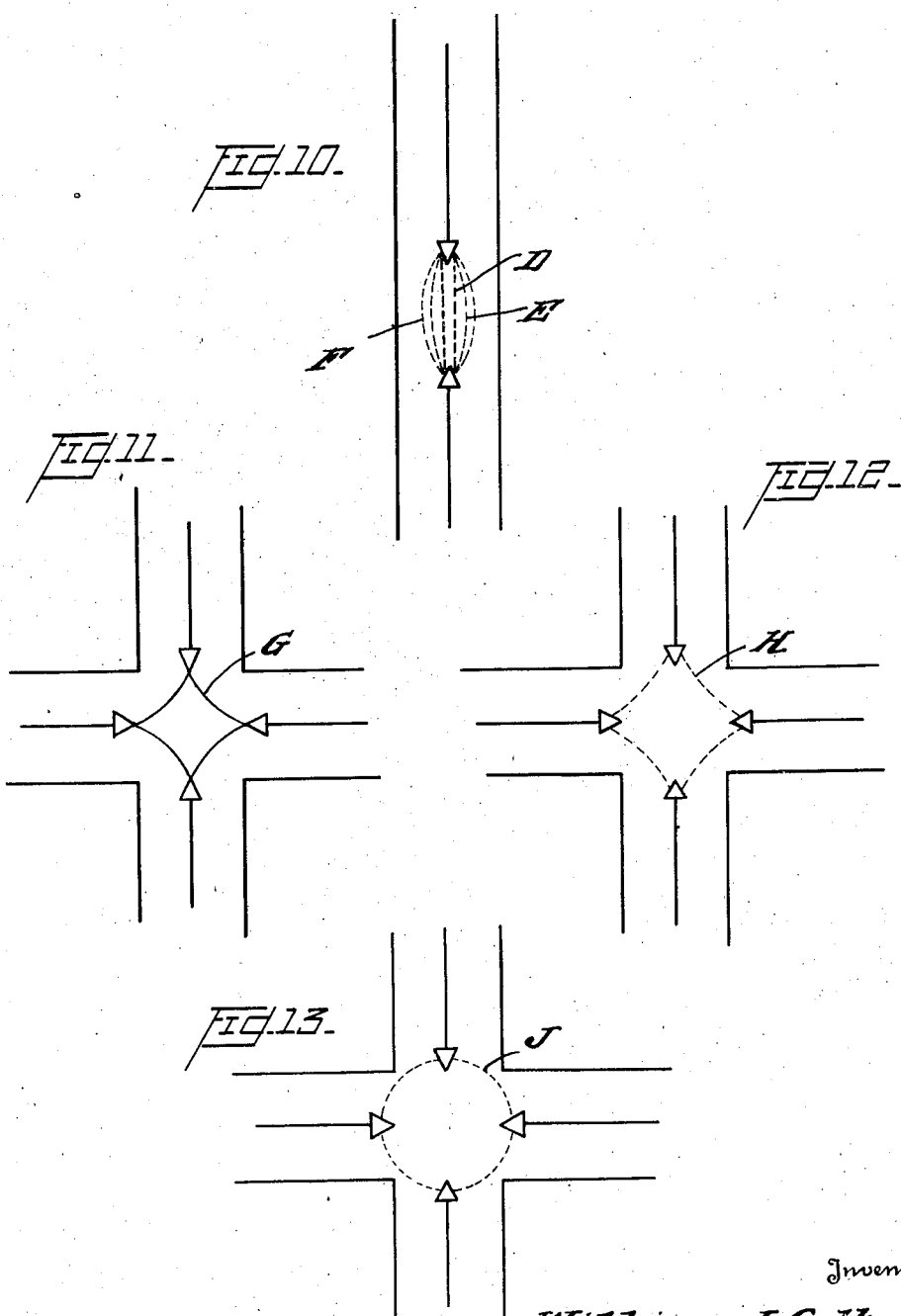

Patented Oct. 18, 1949

2,485,478

UNITED STATES PATENT OFFICE 2,485,478

METHOD OF ELECTROCHEMICALLY PRODUCING NITROGEN OXIDE IN THE PRESENCE OF TANTALUM ELECTRODES

William J. Cotton, Butler, Pa., assignor to Koppers Company, Inc., Pittsburgh, Pa., a corporation of Delaware Application December 9, 1947, Serial No. 790,568

29 Claims. (Cl. 204—179)

This invention relates to the electrochemical production from a nitrogen-and-oxygen-containing medium, as for example, a naturally occurring or synthetic mixture of nitrogen and oxygen gases of nitrogen oxide. The electrochemical transformation of the nitrogen-and-oxygen-containing medium is carried out in a gas discharge apparatus provided with tantalum electrodes. The gaseous material in the gas discharge apparatus is subjected to the action of a cyclic electrical discharge of a particular predetermined character. It has been discovered that a mixture of nitrogen and oxygen gases have a series of critical frequencies or wave lengths or activation quanta which are characteristic of the gas and which cause the components of the gaseous mixture to react to produce nitric oxide in yields which are substantially greater than has been hitherto possible.

Not only has it been discovered that certain gaseous materials including nitrogen gas and a mixture of nitrogen and oxygen gases may be electrochemically transformed in the presence of a frequency which is critical of the gas undergoing transformation, but also it has been discovered that the metals and metalloids have what is known as critical electrode frequencies which are characteristic of the material of the electrode. It has also been discovered that certain critical gas frequencies closely approximate or are substantially identical with certain critical electrode frequencies. When this is true, then this discovery can be applied in the efficient production of nitrogen oxide from a mixture of nitrogen-and-oxygen-containing gases with the resultant further increase in yields. More specifically, a mixture of nitrogen and oxygen gases have a series of critical or optimum gas frequencies, and tantalum has a series of critical electrode frequencies. One of said critical gas or reaction frequencies closely approximates a critical electrode frequency for tantalum; and another of said gas or reaction frequencies closely approximates another critical electrode frequency for tantalum. In the present specification the discharges have what is known as a critical energy quantum or a critical frequency or a critical wave length. Stating the above in different language, in accordance with the present invention, in one of its forms, the gaseous medium, as for example, a mixture of nitrogen-and-oxygen-gases such as may be present in the atmosphere, is subjected to a cyclic electrical discharge generated by an energy quantum or frequency which is one of a series of critical energy quanta of the gaseous material being reacted and which is also one of a series of critical energy quanta characteristic of the electrode material of the discharge apparatus in which the electrochemical transformation is being effected.

When the gaseous material, as for example a mixture of nitrogen and oxygen gas as present in the atmosphere, is subjected to a cyclic electrical discharge of a frequency or wave length or energy quantum which approximates the critical frequency for both the electrode and the gas undergoing transformation, or where these two frequencies are fairly close together the electrochemical transformation of the gas is promoted or activated with the result that there is produced a super-yield of the transformed material higher than would be obtained by subjecting the same gaseous medium, or mixture of gases, to a cyclic electrical discharge having the critical frequency or energy quantum characteristic of the gas being treated but in the presence of an electrode material which is not responsive to the critical or optimum frequency wave length or energy quantum used.

In accordance with one form of the present invention, there is provided a method of producing exceedingly high yields of nitrogen oxide in a gas discharge apparatus having disposed therein a plurality of electrodes which function to supply the apparatus wih a plurality of cyclic electrical discharges of different energy quantum, said discharges producing a composite luminous electrical discharge.

Stated differently, the present invention comprises producing nitrogen oxide by introducing a gaseous medium consisting principally of oxygen gas and nitrogen gas into a gas discharge apparatus provided with a plurality of spaced electrodes disposed therein to supply the reactor with a plurality of cyclic electrical discharges having different energy quanta, said electrodes containing as their essential activating constituent an electrically conducting tantalum material. The gaseous medium is subjected in the presence of said tantalum electrodes to the action of a cyclic electrical discharge produced by the intersection and merging of at least two separate cyclic electrical discharges of different energy quantum, one of said discharges being generated by cyclic electrical energy having an energy quantum content equivalent to that present in a wave train sinusoidal in character and lying between the wave band limits of 25 to 85 meters in length (12.00 to 3.53 mc.).

In one form of the invention the electrical discharges may differ in energy quantum by at least 0.065 of the energy quantum present in a sinusoidal wave of 1 mc. frequency. When the energy quantum of the respective charges differs as set forth then the increase in yield of nitrogen oxide calculated as nitric acid per kvah. is about 100% greater than that obtained when using the higher energy quantum component alone. The increase in yield increases as the difference in energy quantum between the two energy components increases to 0.1 of a megacycle and to 0.2 of a megacycle and this increase continues until the difference between the quanta corresponds to a frequency difference of about 2 megacycles. A further increase of the difference of the frequencies between the two components does not produce any significant further increase in yield.

As more specifically hereinafter pointed out, when using crossed discharges, the preferred operating range is one of the discharges lying between the wave band limits of 30 meters and 80 meters and satisfactory yields of nitrogen oxide are produced when operating with a wave length of 30 meters or a wave length of 80 meters or wave lengths closely adjacent thereto provided tantalum electrodes are used.

As hereinafter pointed out, the maximum yields obtained when using one of the crossed discharges within a wave band lying between the limits of about 50 to 55 meters in length, the gas discharge apparatus in which the nitrogen and oxygen gaseous medium is being reacted being provided with tantalum electrodes, discharges which initially crossed each other merge to produce a single luminous operating discharge.

In one form of the invention, either when operating with a high frequency discharge alone or with the merged luminous discharge produced by crossing a plurality of discharges, the decomposition of the nitrogen oxide formed in the gas discharge apparatus is inhibited by keeping the temperature of the gas discharge apparatus and its contents below about 400° C., and in some cases, below about 200° C. The lower temperature limit may be around −80° C. However, normally the reaction is carried out at a temperature between 25 and 30° C. which is normal atmospheric temperature and 200° C. or 400° C.

The optimum energy quanta, wave lengths or frequencies herein set forth are crossed in a gas discharge apparatus with a second cyclic discharge, the two discharges being at an angle to each other and preferably for maximum results at a right angle to each other or an angle varying from 45° to 90°, said second discharge being preferably generated by a cyclic energy having an energy quantum content equivalent to that present in a wave train, sinusoidal in character, and lying between the wave band limits of 30,000,000 meters (10 cycles) and 600 meters (500,000 cycles) per second. Satisfactory results may be obtained when using as a second crossing electrical discharge, one which lies between the wave band limit of 30,000,000 meters (10 cycles) and 30,000 meters (10,000 cycles). Other operating frequencies for the second discharge will be hereinafter referred to.

In accordance with one form of the present invention, there is provided a method of producing high yields of nitrogen oxide comprising introducing a gaseous medium consisting principally of oxygen gas and nitrogen gas into a gas discharge apparatus in the presence of separately spaced electrodes containing as their essential activating constituent an electrically conducting tantalum material and subjecting said gaseous medium in the presence of the activating tantalum electrodes to the action of a luminous electrical discharge which is the resultant of a critical or optimum reaction frequency characteristic of the nitrogen and oxygen gas being electrochemically transformed, and a critical tantalum electrode frequency occurring in a critical tantalum electrode series active for the gas being transformed, said critical or optimum gas reaction frequencies being closely adjacent one another, as, for example, within the limits of 10% of the average of their respective critical wave lengths or frequencies.

Simultaneously in one form of the invention, the decomposition of the nitrogen oxide is inhibited by keeping the temperature of the gas discharge apparatus below 400° C. As hereinafter pointed out, the best results are obtained when using cross discharges and minimum sustaining energy, the latter being a factor in keeping the temperature below about 400° C. or below about 200° C. and in either case, above minus 80° C. and thereby inhibiting the decomposition of the nitrogen oxide.

In one form of the invention the gas discharge apparatus is provided with a plurality of pairs of electrodes, the extended axis between one pair of electrodes intersecting the extended axis between another pair of electrodes. The discharge between one pair of electrodes initially crosses the discharge between the other pair of electrodes and the discharges intersect and merge to provide a luminous discharge. The crossing of the discharges decreases the energy density or inversely increases the volume of the discharge. With the decrease in energy density of the discharge the temperature of the discharge decreases and this is partially responsible for the high yields obtained when using crossed discharges or their equivalent, it being pointed out hereinafter that a three electrode apparatus may be used.

In one form of the present invention there is provided a method of producing nitrogen oxide comprising introducing gaseous medium, consisting principally of oxygen gas and nitrogen gas, into a gas discharge apparatus provided with a plurality of spaced electrically conducting metallic tantalum-containing electrodes in which tantalum predominates, and subjecting said gaseous medium to the action of a cyclic electrical discharge which is generated by cyclic electrical energy having an energy quantum equivalent to a sinusoidal frequency selected from the following group of frequencies and frequency ranges: between about 8.82 mc. (34 meters) and about 7.50 mc. (40 meters); between about 4.54 mc. (66 meters) and about 3.95 mc. (76 meters; between about 3.06 mc. (98 meters) and about 2.91 mc. (103 meters); between about 1.80 mc. (167 meters) and about 1.74 mc. (172 meters); between about 1.07 mc. (280 meters) and about 1.01 mc. (296 meters); about 0.983 mc. (305 meters); between about 0.531 mc. (565 meters) and about 0.517 mc. (580 meters); and about 0.268 mc. (1119 meters). The frequency bands of 34 to 40 meters; 66 to 76 meters; 280 to 296 meters; 565 to 580 meters are critical gas reaction frequency bands at which increased yields of nitrogen oxide are obtained, even when operating with high frequency current alone.

The frequency bands of 98 to 103 meters and 167 to 172 meters and frequencies of about 305 meters and 1119 meters are critical electrode frequencies for tantalum. The relationship between frequency in megacycles per second and meters is set forth in the following table:

| Megacycles | Meters |
|---|---|
| 8.82 | 34 |
| 7.50 | 40 |
| 4.54 | 66 |
| 3.95 | 76 |
| 3.06 | 98 |
| 2.91 | 103 |
| 1.80 | 167 |
| 1.74 | 172 |
| 1.07 | 280 |
| 1.01 | 296 |
| 0.983 | 305 |
| 0.531 | 565 |
| 0.517 | 580 |
| 0.268 | 1,119 |

In one form of the invention there is provided a method of producing nitrogen oxide comprising introducing a gaseous medium consisting principally of oxygen gas and nitrogen gas into a gas discharge apparatus including a reactor, said apparatus being provided with a plurality of spaced metallic electrodes disposed therein to supply the reactor with a plurality of cyclic electrical discharges having different energy quanta, said electrodes containing as their essential activating constituent an electrically conducting tantalum-containing material in which tantalum predominates, and subjecting said gaseous medium, while under a pressure of between about 150 and about 725 mm. of mercury, to the action of a cyclic discharge produced by the intersecting and merging of at least two separate cyclic electrical discharges of different energy quantum, each of said discharges emanating from a separate electrode, one of said discharges being generated by a cyclic energy quantum equivalent to a sinusoidal frequency of between about 10 cycles (30,000,000 meters) and 60 cycles (5,000,000 meters), and the other discharge being generated by cyclic electrical energy quantum equivalent to sinusoidal frequency between about 12 mc. (25 meters) and about 1.71 mc. (175 meters).

The present invention will be disclosed in connection with the accompanying drawings in which Figure 1 is a cross sectional view of a reactor apparatus capable of generating cross discharges of the character herein described.

Figure 2 is a cross sectional view of a reactor apparatus adapted to effect an electrochemical transformation of a mixture of nitrogen and oxygen gases utilizing only high frequency energy.

Figure 3 is a cross sectional view of a reactor apparatus capable of generating crossed discharges of the character herein described and in which one of the four electrodes is external to the reactor vessel.

Figure 4 is a cross sectional view of a modified reactor apparatus in which one electrode serves as a common ground, but in which all three electrodes are internal.

Figure 5 is a diagrammatical representation of an apparatus for drying the air prior to introduction into the reactor, and for absorbing the nitric oxide content of the exit reactor gases.

Figure 6 diagrammatically sets forth the electrical connections when using an oscillatory type of generator, the high frequency or high energy quantum electrodes being connected to the generator and tank circuits, and the low frequency or low quantum electrodes being connected to the source of the low frequency or low energy quantum.

Figure 7 represents the hook-up of the high frequency generator unit used for producing the high frequency energy supplied to the tank circuit which connects the generator with the reactor.

Figure 8 sets forth the tank circuit used in conveying electrical energy from the generator to the reactor.

Figure 9 sets forth two graphs, the first graph, depicted in solid lines, showing the yields obtained when using cross discharges and tantalum electrodes between the wave band limits of 18 and 90 meters, and the second graph, depicted in broken lines, showing the yields obtained when using tantalum electrodes and high frequency; first, between the wave band limits of 22 and 53 meters and the second between 53 and 79 meters.

Figure 10 diagrammatically depicts the volume and shape of (D) a low frequency discharge; (E) a high frequency discharge corresponding in frequency to a base line frequency; and (F) a high frequency discharge corresponding in frequency to a critical frequency.

Figures 11 to 13 inclusive diagrammatically display the shape and volume of the cyclic electrical discharge emanating from electrodes positioned at an angle to one another and preferably at an angle from 45° to 90°. The discharges which emanate from the electrodes intersect and merge as they leave the electrodes to produce an electrical discharge having approximately the shape and volume shown.

The reactor apparatus shown in Figure 1 comprises a hollow reactor vessel, made of non-conducting or insulating material, such as ceramic material, including glass, and preferably is a high melting glass as exemplified by Pyrex. The reactor is provided with what are herein termed "leg members" 2, 3, 4, and 5, provided respectively with apertured insulating closure members 6, 7, 8, and 9, each of said closure members having mounted therein sheath members 10, 11, 12, and 13 respectively. Each of said sheath members at their respective outer ends are enclosed by apertured closure members 14, 15, 16, and 17 respectively. Passing through the sheath members 10 and 11 and mounted in the end closures 14 and 15 respectively are electrodes 18 and 19 provided with tantalum or tantalum alloy electrode terminals 20 and 21 in which tantalum is the predominating component. This pair of electrodes is normally for the small energy quantum discharge of the two discharges being crossed.

Satisfactory results may be obtained by having the electrodes 18 and 19 and terminals 20 and 21 integral with each other and made of a tantalum metal or tantalum-predominating alloy wire or rod. The use, however, of removable terminals permits the replacement of electrode terminals with new terminals when desired without renewal of the electrode shafts. Passing through the sheath members 12 and 13 and mounted in the closure members 16 and 17 respectively are electrodes 22 and 23, said electrodes being provided with tantalum containing terminal members 24 and 25 respectively, said electrode terminals or tip members being preferably pointed. To electrodes 24 and 25 are supplied either high frequency current or an impulse current having an energy quantum corresponding to the energy quantum of the sinusoidal high frequency current. These electrodes, together with their accompanying electrode terminals, may be in the form of an integral tantalum metal or tantalum-predominating alloy wire or rod, pointed at their inner ends to thereby provide the tantalum-predominating alloy electrode points. The reactor is provided with an inlet member 26 and an outlet member 27.

Regardless as to whether an oscillator type of generator, or impulse type of generator, or any other type of generator is used, the electrode 23 best serves as a hot or high potential electrode, while the electrode 22 passes to ground via a milliammeter as shown in Fig. 6. The electrode 18 and 19 for the smaller energy quantum discharge, connects with the terminals of the high voltage transformer 30 (Fig. 6) yielding 60 cycles, and in such a circuit the high voltage voltmeter 28 and milliammeter 29 are placed in the usual manner. Whatever source 30 is used to provide the smaller energy quantum, it may be protected against possible shorts from the high energy quantum circuit in the reactor by inserting appropriate choke coils, 23c and 23d, between the low quantum electrodes and their connections to the source of low quantum electrodes and their connections to the source of low quantum energy as is indicated in Fig. 6. The numeral 23a identifies a condenser that may be inserted between the hot high frequency electrode 23 and the point 23b to protect the tank circuit from any high voltage surge emanating from the low frequency high voltage pair of electrodes. The circuit shown is operative without either the condenser 23a or the choke coils 23c and 23d and their use is optional and is merely a protective device for the apparatus.

The high frequency or the high energy quantum electrode is connected to the lead 31, said lead and electrode being an integral part of the high quantum supply circuit shown in Figure 6 and more specifically, where an oscillator generator is used, such as is shown in Figure 7.

In the form of the apparatus shown in Figure 2, the reactor 34 has internally positioned therein high frequency electrodes 32 and 33 adapted to supply said electrodes with high frequency energy generated by an oscillatory or impulse generator. In one end of the reactor 34 there is positioned a closure member 35 and at the opposite end of the reactor vessel there is disposed another closure member 36. Mounted in the closure member 35 is a sheath member 37 and mounted in the closure member 36 is a sheath member 38. Mounted in the exterior ends of said sheath members are sheath closures 39 and 40, respectively, through which, respectively, pass the electrodes 32 and 33. These electrodes are provided with tantalum alloy electrodes terminals 41 and 42, respectively. The reactor is provided with an inlet 43 and an outlet 44.

In the form of the apparatus shown in Figure 3 there is provided a hollow vessel 45 having an interior wall 45' made of non-conducting insulating material as exemplified by Pyrex. Within the reactor vessel 45 are positioned sheath tubes or members 46 and 47 through which pass electrodes 48 and 49, provided, respectively, at their interior ends with perforated button electrode terminals 50 and 51, said terminals being of the metal tantalum or an alloy of tantalum in which the tantalum predominates. The sheath member 46 is provided with a closure member 53 through which the electrode 48 passes and the sheath member 47 is provided with a closure member 54 through which electrode 49 passes. In other words, the electrodes are positioned inside of the sheath members and pass centrally therethrough, being mounted in and supported between closure members 53 and 54, respectively. The reactor vessel has sealed in its wall a tubular member 55 closed at its outer end with a closure member 56 which is perforated and through which there passes the high frequency electrode 57 which may also be made of tantalum or an alloy in which tantalum predominates. The reactor apparatus is provided with an external electrode 58 having a terminal 59, said electrode terminal being made of any electrical conducting material. Preferably the electrode terminal 59 consists of a suitable metal, such as copper shaped to the contour of the reactor vessel 45 so as to close an arc varying preferably from 40° to 80° with the tip 60 of the internal electrode 57, said tip serving as a center of curvature. The external electrode 59 is shaped and positioned to draw the discharge emanating from the electrode terminal tip 60 centrally downward between the electrodes 50 and 51, thereby assuring maximum efficiency in yield. The external electrode 59 is shaped and positioned to draw the discharge emanating from the electrode terminal tip 60 centrally downward between the electrodes 50 and 51, thereby assuring maximum efficiency in yield. The external electrode 59 may be placed in direct contact with the outer wall of the reactor vessel, but is preferably spaced at such a distance from the external wall of the reactor vessel as to minimize any heating of the wall. In practice, it has been found that if the external terminal 59 is from 1 to 2 mm. from the external wall of the reactor vessel, satisfactory results are obtained.

In the form of the apparatus shown in Figure 4 the reactor vessel 61 comprises the horizontally extending leg members 62 and 63 and a vertically extending leg member 64 which extends upwardly from the leg members 62 and 63, respectively. Positioned centrally of the sheath members 65 and 66 respectively, are electrodes 67 and 68 provided respectively with tantalum terminals 69 and 70. The sheath members are mounted in a manner similar to that set forth in Figures 1 to 3, inclusive. Within the leg member 64 is positioned a sheath member 71 and passing centrally through the sheath member is the low frequency electrode 72 provided with the low frequency tantalum terminal 73. The leg member 64 is closed by the closure 75 in which the sheath member 71 is mounted, and the sheath member, itself, is closed by the closure member 74. The electrode 67 is a high frequency electrode. The high frequency energy passes across the gap between the electrode terminals 69 and 70 and through the electrode 68 which functions as the ground electrode to ground 76. Instead of arranging the electrodes as shown in Figure 4, any one of the electrodes may be the ground electrode, and the other two electrodes become the high frequency and the low frequency electrodes, and these may be interchanged so that either one is the high frequency electrode or the low frequency electrode.

The mixture of nitrogen gas and oxygen gas to be treated in accordance with the present invention is first dried in the apparatus set forth in Figure 5 in the manner hereinafter described, and then is introduced into the reactor through the inlet member 26 of Figure 1 and passes through the sheath member 10 around the electrode terminal 20 and through the discharge present in the interior of the reactor vessel at and adjacent to the high frequency and low frequency electrode terminals, said discharge which visually appears after initial operation as a single entity being produced by the intersecting and intermingling of the high frequency and low frequency discharges which, in a sense, cross each other. The reaction product leaves the active reactor space, passes through the sheath tube 11 and then passes through the exit member 27. The reaction product then passes through a medium for extracting its nitric acid content, the process method of extraction being set forth in connection with the description of Figure 5.

While, as stated, it is desirable to have the electrode terminals pointed, it is within the province of the present invention to use buttons, nodules, globules, or to have the electrode terminals in any other shape hitherto used in the treatment or electrochemical transformation of chemical products. The sheath members may, under some circumstances, be omitted, but it is highly desirable to retain them in order to force the flow of the gaseous medium being subjected to the action of the crossed discharge in and around the electrode terminals. Further, it may be stated that the sheath members function to a substantial extent to protect the outer vessel from the effect of heat, primarily radiant, which may be produced during the course of the reaction in the reactor. It is preferred that the electrode terminals 20, 21, 24, and 25 project beyond the interior ends of the sheath members in order to avoid heating the ends of the sheath members which might result in the generation of sodium or undesirable ions which tend to generate side reactions.

The following is a specific example, identified as Example 1, illustrating the production of nitric oxide from atmospheric air using the reactor set forth in Figure 1, there being produced peak yields of nitric oxide under the specific operating conditions. In this example, the high energy quantum energy is produced and supplied by an oscillator type of generator and the low energy quantum energy is produced by a standard 60-cycle A. C. transformer.

The diameter of each leg member of the reactor vessel is 32 mm., and the inner sheaths are 23 mm. in diameter. The overall length of the reactor 1 is approximately 10". In starting the apparatus the flow of dried air is initiated through the inlet 26, said air passing through the reactor legs at the rate of approximately 800 cc. per minute under standard conditions. The pressure within the reactor is in the meantime at approximately 335 mm. mercury pressure. There is applied to the high frequency electrode terminals 24 and 25 high frequency energy having an optimum voltage, before striking, of 1474 volts, said voltage dropping immediately on striking the discharge to 250 volts R. M. S. with a corresponding current of 44 milliamperes. The high frequency energy is applied at a frequency of 8.98 mc. (33.4 meters). The high frequency gap between the terminals 24 and 25 is 11 mm; and the low frequency gap between the electrode terminals 20 and 21 is 25 mm. After applying the high frequency energy there is applied to the low frequency electrodes 18 and 19 a low frequency current having a frequency of 60 cycles at approximately 2000 volts, which immediately drops to 1000 volts, the latter being accompanied by a current of 20 milliamperes. The high frequency energy thus corresponds with 11 watts, whereas the low frequency energy corresponds with 20 watts, the total being 31 watts, assuming a power factor of 1.00, of which approximately 35% is high frequency energy.

The reaction products produced under the above conditions are absorbed by passing through silica gel, as hereafter set forth in detail, and the silica gel showed an increase in weight for a 6 minute run of 179.1 milligrams of nitric oxide. This corresponds to a yield of 140 grams of nitric acid per kwh. if the power factor be taken as 1.00. If the power factor is less than 1.00 the yield per kwh. is correspondingly higher than 140 grams. Expressing the yield per kvah., the yield is also 140 grams. The yield expressed as kvah. appears on the graph of Fig. 9 as the point R.

It is desired to point out that the expression kvah. and kwh., herein used, refer respectively to kilovolt-ampere hours, and kilowatt hours. It is well known that when dealing with sinusoidal waves, and when the power factor is 1.00, that the two expressions become identical in value. It is further known that when the power factor is less than 1.00, kvah. is correspondingly higher than kwh. It is further known that when using wave trains that are not truly sinusoidal, but are distorted, that an additional factor to correct for such distortion must be introduced.

The following is an additional example, identified as Example 2, setting forth the production of nitric oxide from atmospheric air using the reactor set forth in Fig. 1.

In starting the apparatus the flow of dried air is initiated through the inlet member 26, said air passing through the reactor legs at a rate of 820 cc. per minute, under standard conditions. The pressure within the reactor is maintained at approximately 337 mm. mercury pressure. There is applied to the high frequency electrode terminals 24 and 25 high frequency energy having a potential voltage before striking of 1300 volts, said voltage dropping immediately on striking the discharge to 300 volts r. m. s. with a corresponding current of 23 milliamperes. The high frequency energy is applied at a frequency of 3.87 mc. (77.5 meters). The high frequency gap between the electrodes 24 and 25 is 11 mm., and the low frequency gap between the electrode terminals 20 and 21 is 31 mm. After applying the high frequency energy, there is applied to the low frequency electrodes 20 and 21 a high voltage low frequency current having a frequency of 60 cycles, applied under a potential of approximately 2000 volts, which immediately drops to 1300 volts, the latter being accompanied by a current of 10 milliamperes. Assuming a power factor of 1.00, the high frequency energy thus corresponds with seven watts, whereas the low frequency energy corresponds with 13 watts, the total being 20 watts, of which approximately 35% is high frequency energy. When the power factor is not assumed, the figures above set forth are in terms of volt-amperes instead of watts, the total being 20 volt amperes instead of watts.

The reaction products produced under the above conditions are absorbed by passing through silica gel, as hereinafter set forth in detail, and the silica gel showed an increase in weight for a six minute run of 125.7 milligrams of nitric oxide. This corresponds to a yield of 131.9 grams of nitric acid per kwh., assuming a power factor of 1.00. If the power factor is less than 1.00 the yield would be correspondingly greater than 131.9 grams of nitric acid per kwh. This yield expressed as kilo-volt-ampere hours appears on the graph of Fig. 9 as point S.

Additional runs were made in the reactor of Fig. 1, the electrode terminals all consisting of tantalum, with the high energy quantum component varying between 10 and 90 meters, corresponding to a frequency of 30 to 3.33 mc. respectively; as shown on the graph of Fig. 9, there is an increased yield of nitric oxide and nitric acid when any wave length within said wave band is used in conjunction with low frequency energy, as herein set forth. In operating a reactor of the type set forth in Fig. 1, provided with tantalum electrode terminals, it is preferred that the high frequency wave length used be selected from the wave band corresponding with 25 to 85 meters in length (12.00 to 3.28 mc.). While a wave length selected from the band corresponding to 25 to 85 meters gives very satisfactory results, it should be noted that the best yields are obtained at approximately 52 to 56 meters, the average of which is indicated on curve C of Fig. 9 at the point T.

The curve C of Figure 9 shows points obtained by operating at other high frequency wave lengths, these points being above the base line M'—N'. Therefore the line M'—N' may be defined as a line drawn through the points of minimum yields that lie between and beyond peaks. The relationship between curves A, B, and C and base lines M—M and M'—N' will be later referred to in detail.

It is desired to point out that the maximum yield of nitric acid, as shown by the graph of Figure 9 is obtained when a high frequency wave is used, selected from the wave band lying between about 18 and about 90 meters, and preferably between about 25 and 85 meters, with tantalum electrodes or electrode terminals.

The air which is introduced into the reactor which is dried prior to its introduction into the reactor vessel by passing it through soda-lime tube 77, Figure 5, then through the silica gel tube 78, thence through the conduit 79, through the orifice 80 of the differential manometer 81, through the valve 82 and thence to the reactor 1. At the point 83 is connected the mercury manometer 84 which measures the internal pressure of the reactor. From the reactor 1 the exit gas passes through exit conduit 85 to a series of silica gel absorber tubes 86, 87, and 88, which tubes extract the nitric oxide content of the exit gas or gases. The vacuum is applied by means of the vacuum pump 89 and the amount of vacuum adjusted by means of the release valve 90 and the main valve 82 in the supply line. The soda lime functions not only to take out a portion of the moisture, but also to extract from the air substantially all of the carbon dioxide. The air, as delivered to the reactor one, has a moisture content of about 5 to 8 milligrams of moisture per liter. When the run is started, the valves 91 and 92 are closed and valves 93 and 94 are opened. When operation has reached equilibrium, valves 91 and 92 are quickly opened and valves 93 and 94 are closed noting the time of doing so with a stop-watch. Upon conclusion of the run the valves 93 and 94 are opened while valves 91 and 92 are closed. The time interval during which valves 91 and 92 are opened to the absorber and the valves 93 and 94 of the by-pass are closed is six minutes. During this period the silica gel is absorbing the nitric oxide produced by the reaction. After the run is terminated, the silica gel tubes are weighed and the increase in weight is taken as the weight of nitric oxide produced in six minutes.

It will be noted that upon the conclusion of the experiment carried out as above described that the silica gel tubes 86, 87, and 88 will be under a slight vacuum and, hence, will not have the exactly correct weight that they should exhibit. To correct the above air is admitted to the silica gel tubes via the valve 97 after passing through soda lime tube 95 and silica gel tube 96.

It is desirable to point out that in producing nitric oxide by subjecting a nitrogen-containing gas, such as air, or its equivalent, to the action of a crossed composite discharge, the energy contributed by the high energy quantum component is desirably 4% or more of the total energy supplied to both the low energy quantum and the high energy quantum discharges, and may vary between 4% and 70%. In some cases, the per cent of high energy quantum supplied during the reaction period may vary from 25 to 70% and satisfactory results have been obtained when it averages 50%.

Referring to Figure 10, there is diagrammatically illustrated the volume and shape of the luminous discharge formed when using high frequency alone, the discharge volume D representing the discharge produced by subjecting any gas including a mixture of nitrogen and oxygen to a low frequency such as typified by 60 cycles. Using a high frequency discharge whose frequency corresponds with a base line frequency such as X or Y as shown in Figure 9, the volume of the luminous discharge between the electrodes increases as is illustrated by E of Figure 10. When using high frequency alone if a frequency be selected that corresponds with a peak frequency such as for peak A or peak B of Figure 9 the volume of the luminous discharge between the electrodes still further increases as is set forth by F of Figure 10.

Referring to Figures 11 to 13, inclusive, these figures diagrammatically illustrate what happens to the discharge when two frequencies are crossed. For example, in Figure 11, the high frequency may be of the same magnitude as the high frequency which produced discharge E of Figure 10 and the discharge of the other frequency may be lower, as for example, 10, 30, 60, 100 cycles, 500 cycles, or 10,000 cycles. Under these circumstances as shown in Figure 11, the discharge volume G is greater than the discharge volume E of Figure 10.

Similarly using a frequency corresponding to the peak frequency of peak A (36 meters) or peak B (68 meters) and crossing the same with any of the frequencies herein set forth, as for example, 10 cycles, 30 cycles, 60 cycles, 100 cycles, 5,000 cycles, 10,000 cycles, 100,000 cycles, 200,000 cycles, or 500,000 cycles or any frequency in between 10 cycles and 500,000 cycles, or any frequency which differs from frequency A or frequency B by 65,000 cycles or more, the volume of the discharge increases as shown in Figure 12, the volume being graphically depicted by the volume space shown in dotted lines and identified by the letter H. In the above discussion of Figures 10 to 13, the total power required to produce the increasing volume of luminous discharges actually decreases from D to J.

Similarly when a frequency such as corresponds to T on curve C is crossed with a second lower frequency of the character above set forth, the volume of the discharge is further increased over what is shown in Figure 12, the increase being due to the use of the peak frequency T or frequencies on the shoulders of curve C varying between the limits hereinbefore set forth, and the crossing of the discharges.

From the standpoint of energy density that of discharge D of Figure 10 is approximately 200 times greater than the energy density of discharge J of Figure 13. In like manner, the energy density of discharge H of Figure 12 is greater than the discharge density of J of Figure 13. Likewise, the energy density of discharge G of Figure 11 is greater than the energy density of discharge H of Figure 12. The crossing of the discharges in all cases decreases the energy density or, inversely, increases the volume of the discharge. The above indicates that the crossing is highly advantageous, and the best results will be obtained when there is a substantial difference in frequency, wave length, or energy quantum, between the higher frequency energy and the lower frequency energy. When the difference between the two energy components is at least 65,000 cycles per second, the increase in yield becomes significantly apparent. As the difference in energy quantum or frequency increases, between the higher frequency energy and the lower frequency energy more advantageous yields are produced by the crossing of the discharges. However, as the difference between the energy component approaches 2 megacycles, the rate of yield increase slackens. The energy density may be measured in watts per cubic centimeter or joules per cubic inch.

As shown in Figure 1, the crossed electrodes are all in the same plane and said plane may be a vertical plane, a horizontal plane, or any intermediate plane. It is within the province of the present invention, in its broad aspects, to supplement the four electrodes as shown in Fig. 1, by an additional pair of low energy quantum electrodes. The additional pair of low energy quantum electrodes may have the same low energy quantum passing through as that which passes through electrodes 18 and 19; or the additional pair of electrodes may utilize energy quantum of the same magnitude as that passing through the high energy quantum electrodes 22 and 23; the additional pair of electrodes may use a lower energy quantum than that passing through the low energy quantum electrodes 18 and 19, or a magnitude intermediate between that passing through the low energy quantum electrodes 18 and 19 and the high energy quantum electrodes 22 and 23.

It is within the province of the present invention to carry out the reaction herein set forth using sub-atmospheric pressure, atmospheric pressure, or super-atmospheric pressure.

In producing nitric oxide, the air may be enriched with oxygen and, within limits, the yield will be somewhat increased over the yield of nitric oxide produced when only air is electrically transformed in accordance with the present invention. Air may be enriched so that it has up to 50% of oxygen and when so enriched this enrichment will produce an increase in yield of nitric acid of about 10%.

Figure 7 sets forth the hook up of the high energy quantum generator unit used when using the oscillator type of generator for producing the high quantum energy supplied to the tank circuit connecting the generator to the reactor. The diagram may be divided into four circuits, 98, 99, 100, and 101. Circuit 98 is the full-wave rectification unit wherein the leads 102 connect to the 110-volt 60-cycle supply on the panel board. The numeral 103 identifies the transformer delivering its secondary high voltage current to the two rectification tubes 104 and 105, the filaments of which are heated by current generated in the filament transformer 106. The resistor 108 and the fixed condenser 109, together with the choke coil 107, constitute a filter. The high voltage D. C. current produced by this circuit leaves same by means of the ground connection 110 and the lead 111, which delivers to the plates of the tubes 112 and 113 of the oscillatory circuit. The transformer 114, connected with 10-volt supply, provides the filament power for the tubes 112 and 113. The desired frequency or energy quanta is obtained by means of tuning the oscillatory circuit 99, such tuning being effected by operation of the variable condenser 115 and the inductance 116.

In carrying out the work described as above set forth between the limits of about 18 meters to about 90 meters, or between about 16.67 and about 3.33 mc. or between about 16.67 meg.-seconds and about 3.33 meg.-seconds, it is necessary to change the size of the inductance 116 by steps. This is done by removing one inductance and replacing same with another inductance having the desired characteristics. The minor circuit 117 is a coupling circuit, coupling the oscillatory circuit 99 to the grid input circuit 118 of the power amplifier circuit 100. The grid circuit of the power amplifier is tuned by means of the variable condenser 119 and by changing inductance coils 118 in a manner similar to the change effected in inductance 116, as necessary to meet requirements. The combination of resistor 120 and condenser 121, both of which are grounded, serves to minimize or eliminate parasitic oscillations that might render the output less monochromatic. The resistor 122 provides grid bias for the power amplifier tubes 123 and 124. Transformer 125 provides power for the filaments of the power tubes 123 and 124. These tubes amplify power provided by circuit 101, imparting to it the particular energy quantum developed by the oscillatory tubes 112 and 113. Transformer 126 connected with a 110-volt supply, provides the energy to the power supply rectification tubes 127 and 128. Transformer 129, also connected with a 110 volt supply, provides the power for the filaments of tubes 127 and 128. It will be observed that circuit 101 is essentially similar to circuit 98. The combination choke 130, fixed condenser 131, and resistor 132 constitutes a filter. The rectified power leaves the circuit via the milliammeter 133 to ground and the lead 134 to the power amplifier circuit 100. The voltage at which it is delivered is measured by the voltmeter 135. The power amplifier circuit 100 is tuned to the frequency where energy quanta desired as generated by means of the oscillator tubes 112 and 113 of oscillator circuit 99 by means of the variable condenser 136 and the inductance 137. The inductance 137 is varied by means of changing coils to meet various energy quanta requirements as is done in the case of inductances 116 and 118. The power amplifier circuit 100, thus tuned and supplied by D. C. power from circuit 101, transmits the amplified high frequency or high energy quanta to the coupling circuit 138, which in turn delivers to a tank circuit such as is shown in Fig. 8.

Fig. 8 represents a tank circuit of the type known as end-grounded. The portion of the coupling circuit shown as 139 leads to and is a part of the coupling circuit 138 of Fig. 7, and it is placed at the end of the inductance 140. It will be noted that in this type of tank circuit the ground 141 is at the end of the tank coil 140 instead of in the middle 142 as would be the case had the tank circuit been of the center-grounded type. The coupling circuit 138—139 serves merely to transfer the high frequency or high energy quanta from the generator set to the tank circuit proper. The point 143 is the location of the discharge. Tuning of this tank circuit to the generator circuit is carried out by use of the variable condenser 144 and by changing inductance coils 140 as was done with inductance 116, 118, and 137 to meet requirements. The circuit conductors 145 are preferably of copper tubing. A thermomilliammeter is located at 146 and a high energy quanta voltmeter, in this case a high frequency voltmeter of the electrostatic type, is located at 147. The circuit is grounded at 141.

When the crossed discharge method is used to electrically transform products, the rate of flow of the material which is flowing through the reactor, which is to be transformed, must be greatly increased for frequencies corresponding with peak yields; or, stated differently, for energy quanta corresponding to energy peak yields, the rate of flow of about 800 cc. per minute represents the most advantageous rate of flow of the air through the reactor to provide peak yields at the preferred peak energy quantum magnitudes herein set forth. The rate of flow may be varied from 400 cc. per minute to 1500 cc. per minute without detracting greatly from the advantages of the process.

The electrical discharge in the reactors set forth in Figs. 1, 2, 3, and 4 of the drawing may partake of the glow, corona, or spark type characteristics, depending upon the pressure at which the discharge is carried out and on the frequency selected in the case of the oscillatory type of generator or the impulse repetition period if an impulse generator is used. In the case of the oscillatory type of generator and using frequencies between the limits of 500 kc. to 15 mc., as the pressure at which the reaction is carried out increases above that of about one-half atmosphere, the discharge tends to be a corona or spark discharge, but at pressures below about one-half an atmosphere, the characteristics of a glow discharge begin to become apparent and become increasingly pronounced as the pressure decreases.

In the case of the impulse generator operating, as for example, with a repetition value or periodicity of 10,000 periods per second, delivering energy quanta having an energy content, for example, equivalent to a frequency within the range of 0.5 and 15 megacycles, then the pressure at which the corona and glow characteristics are both present, without either predominating, will vary somewhat from about one-half an atmosphere. However, it is desired to indicate that the present invention is not limited to the use of a pressure of about one-half an atmosphere. The pressure present in the reactor may be decreased until said pressure approaches a vacuum as a low limit.

Referring to Fig. 9, curve A in dotted line represents the yields obtained when working between the limits of 22 meters and 53 meters utilizing the high frequency discharge in the presence of tantalum electrodes. It is to be noted that when atmospheric air is subjected to a high frequency discharge alone of about 38 meters that the yield is exceedingly high, being appreciably higher, for instance, than when operating at 30 or 25 meters. Likewise, it is to be noted that when the atmospheric air is subjected to the action of high frequency energy of about 65 meters that a peak yield is obtained, said operations employing tantalum electrodes.

In accordance with the present invention, it has been discovered, first that mixtures of nitrogen and oxygen gases exhibit what is known as a series of critical reaction wave lengths or frequencies; that is, yields are substantially increased when the mixture of gases is electrochemically transformed at certain predetermined frequencies. Applicant has also discovered that various electrode materials also exhibit critical electrode frequencies; that is, frequencies at which the yield of the material being electrochemically transformed is much greater than other frequencies. Tantalum exhibits a number of critical electrode series; that is, a number of series, in each series of which there are critical wave lengths which give substantially increased yields when tantalum is used as electrode material in the electrochemical transformation of a gas, said gas being subjected to one of the critical electrode frequencies.

The metal tantalum exhibits at least four series, and there are indications that there is a fifth series. For the purposes of the present application, it is immaterial whether there are four or five series. The critical electrode series for tantalum expressed in meters is as follows:

| Active for NO | | | Active for Hydrazine, |
|---|---|---|---|
| Series (1) | Series (2) | Series (3) | Series (4) |
| 16.95 | 33.90 | 50.85 | 67.80 |
| 33.90 | 67.80 | 101.7 | 135.6 |
| 50.85 | 101.7 | 152.6 | 203.4 |
| 84.75 | 169.5 | 254.3 | 339.0 |
| 152.6 | 305.1 | 457.7 | 610.2 |
| 288.2 | 576.3 | 864.5 | |
| 559.4 | 1,119 | | |
| 1,102 | 2,204 | | |

It has been further discovered that not all of the series given function in the case of any particular chemical reaction. It is applicant's discovery that only series 2 functions in the case of the production of nitrogen oxide. For purposes of illustration it has been found that series 4 functions in the case of the production of hydrazine, but series 2 does not and vice versa. Neither series 1, 3, or 4 functions to increase the yields of nitrogen oxide when tantalum electrodes are used. It is to be understood that the series herein set forth is distinctive and characteristic of the metal tantalum and tantalum alloys consisting predominantly of tantalum. It may be stated that a mixture of nitrogen and oxygen gases exhibit characteristic reaction frequencies at or about 9, 18, 36, 72, 144, 288, 576, 1152, 2304, and 4608 meters. It is to be noted that when a mixture of nitrogen gas and oxygen gas, as for example, atmospheric air, is subjected to a frequency of 36 meters that the yield is substantially increased because this is a critical reaction frequency for mixtures of nitrogen and oxygen gases. While it is not desired to be bound by any theory, it appears that at these critical frequencies the material undergoing transformation absorbs energy, and this energy is put to work to produce a useful effect which expresses itself as an increase in yield and that at other frequencies which are not critical frequencies characteristic of the material being reacted, there is no absorption of energy, and consequently there is no increase in yield. Be that as it may, it is a fact that at 36 meters the yield is increased. It is also a fact that at about 34 meters, tantalum when used as electrode to effect the electrochemical transformation of a mixture of nitrogen and oxygen gases gives an increased yield at 34 meters, this figure being expressed in series 2 in the above table as 33.9 meters. Thus it becomes apparent that the optimum conditions for the production of nitrogen oxide for optimum yield when using tantalum electrodes might be expected to be an average of 34 meters and 36 meters which is 35 meters. But curve A shows that the maximum yield is actually obtained at 38 meters, a shift toward peak B of 3 meters.

In the above the 38 meter wave length is used alone and is uncrossed.

As previously stated the mixture of nitrogen and oxygen gases exhibit a peak yield at about 72 meters. By examining the critical electrode series for tantalum and, particular series 2, it is to be noted that tantalum exhibits a peak yield when used as electrode when the electrochemical transformation of the gas is effected at about 68 meters. In the table the figure given is 67.8 meters. The average of 72 meters and 68 meters is 70 meters. It is to be noted that from curve B there is a maximum yield of nitrogen oxide at about 66 meters which is a shift of four meters towards peak A. In other words the two combinations peaks A and B have each been shifted toward the other by three or four meters from a calculated average position. That is, the tops of the peaks do not coincide with the average of the component wave lengths when two such combination peaks, each being a combination of a critical reaction peak and a critical electrode peak, lie close together as is here the case. This phenomenon has been repeatedly observed in various cases. It has been found that in all such cases the tops of the two combination peaks are shifted toward one another. In this particular instance the shift of each toward the other from the calculated average values amounts to three or four meters.

It is apparent, in view of the above, that there are substantial advantages in the present process wherein a mixture of nitrogen gas and oxygen gas, preferably such as is present in the atmosphere, is electrochemically transformed in the presence of tantalum electrodes utilizing predetermined combinations of critical gas reaction frequencies and critical electrode frequencies wherein the two are substantially identical or are closely adjacent.

The present invention has been carried a step further. Curve C of Figure 9 represents results obtained by using crossed discharges and tantalum electrodes with a higher energy component corresponding to the arithmetical average of the four component critical frequencies; namely, the critical reaction frequencies 36 and 72 meters and the critical electrode frequencies 33.9 and 67.8. This average is about 52 meters or a little higher, and it is to be noted that the maximum yield of nitrogen oxide is obtained utilizing cross discharges when a mixture of nitrogen gas and oxygen gas, as for example, atmospheric air, is subjected to a cyclic electrical discharge of 53 meters or its equivalent when expressed in terms of impulse energy. It is, therefore, clear that the process utilizing cross discharges is intimately related to the process when employing a high frequency discharge only. It is also clear that there is a very significant increase in yield by employing crossed cyclic electrical discharges in the transformation in the mixture of nitrogen gas and oxygen gas to produce nitrogen oxide, there being an increase in yield from about 95 grams per kvah. to 155 grams per kvah.

While it is possible to subject a mixture of nitrogen gas and oxygen gas, as for example, the atmosphere, to a cross discharge of the character herein set forth in which the high frequency discharge is about 52 or 53 meters and the low frequency discharge is substantially less, as for example, 10, 30, 60, 100, 5000, or 10,000 cycles, the cross discharge is not exceedingly stable. By that it is not meant to imply that it will not operate. A skilled operator can frequently hold the cross discharge stable for long periods of time, but it is difficult, and, therefore, from a practical standpoint, it is more desirable to carry out the electrochemical transformation of the gas being consumed at higher or lower frequencies than the T point frequency of curve C of Fig. 9, that is, about 52 or 53 meters. Good operating results were obtained at a frequency of 33.4 meters represented by the point R of curve C and also by a frequency of 77.5 meters represented on the curve C by the letter S. However, it is to be distinctly understood that utilizing cross discharges of the character herein set forth where the discharges intersect and intermingle to produce a luminous discharge which may be thought of as a composite discharge which, in reality, is produced by two separate discharges of the character set forth which do intersect and intermingle, that the high frequency component may be varied between the limits of 18 and 90 meters or, preferably, between the narrower limits of 25 and 85 meters. It is not necessary to use in combination therewith any particular low frequency discharge. The low frequency discharge may be greatly varied. All that is necessary is that the low frequency discharge when used in conjunction with the high frequency discharge used as herein set forth acts to produce the phenomena exhibited on Fig. 9 wherein curves A and B have been merged and bulged and the peak of the combined result greatly raised.

In the production of luminous discharge under the conditions herein set forth as the percent of high frequency energy increases, and the percent of low frequency energy decreases, the glow tendencies of the discharge become more pronounced. Good operating results are obtained operating at a wave length of 30 meters represented by the point R, and 33.4 meters represented by the point R of the curve C; and also by a frequency of 80 meters represented by the point S', and by a wave length of 77.5 meters represented by the letter S on the curve C. The points R and S correspond with the herein set forth first and second examples, respectively.

When using crossed discharges, the optimum results are obtained when using a pressure of approximately 0.4 of an atmosphere. However, it is within the province of the present invention to use a pressure varying from about .2 of an atmosphere to .9 of an atmosphere and under some circumstances a higher pressure can be used, as for example, 1 to 5 atmospheres and lower pressure, as for example, .1 of an atmosphere.

In the preferred form, the luminous cross discharge is a relatively cold discharge as is evidenced by:

(a) The exit gases formed in the production of nitric oxide are seldom more than the gas entering the reactor which normally is 20° to 30° C. Where the crossed discharges are operated at critical frequencies as above set forth, the difference in temperature between the entering and exit gases may not exceed more than a fraction of a degree centigrade and, in many cases, there frequently has been an actual drop in temperature of the gas in passing through the crossed discharge zone.

(b) An optical pyrometer trained on the discharge volume through a quartz window in the wall of the gas discharge apparatus indicates a temperature, within the limits of accuracy of a pyrometer, substantially the same as for entering gases.

(c) Metallic lithium melts at 186° C. A piece of metallic lithium cut to have sharp edges can be inserted into the discharge space as a probe or intermediate electrode without having its edges even slightly rounded.

The temperature limit of 186° C. is illustrative of the cold state in the production of nitric oxide by subjecting air to the action of a plurality of electrical discharges which cross each other and which emanate from separately spaced electrodes, one of said electrical discharges being a critical discharge. Higher temperatures may be used provided there is no substantial decomposition of the reaction product. Therefore, it is not desired to be limited strictly, when producing nitric oxide, to temperatures of 186° C. or 200° C. as the upper temperature limit. Some of the advantages, from the standpoint of the yield, may be obtained if the reaction temperature is maintained below about 500° C. It is desired to state that at 200° C. there is little decomposition of nitric oxide. While there is somewhat more decomposition at temperatures between 200° C. and 500° C. it is recognized that the temperature of reaction may be maintained at 500° C. or between room temperature and 500° C.

The point is here made that the reaction temperature when producing nitric oxide may be considerably above 500° C., and still there will be an increased yield of nitric oxide than what can be produced by present day methods.

It is desirable to operate the crossed discharge method and apparatus at minimum sustaining energy. By minimum sustaining energy is meant that amount of energy, preferably supplied in approximately equal amounts by each of the two contributing frequencies, that will just sustain the discharge. If amounts of energy in excess of the minimum sustaining energy are used, the excess electrical energy is converted, not into chemical energy to do useful work, but is wasted by conversion into heat energy, the production of which in turn tends to decompose product already formed. Operation above minimum sustaining energy thus rapidly reduces yield. Starting the discharge with more than minimum sustaining energy, the discharge can be adjusted to minimum sustaining energy by gradually decreasing the total energy supply as long as the yield per unit energy increases. When the yield ceases to increase with further reduction of energy supplied, and it may even start to decrease, then the point of minimum sustaining energy has just been passed. Adjustment is made in the energy supplied to that which results is maximum yield per unit of total energy supplied.

While the energy quanta, either oscillatory or impulse, may be supplied to the high energy quantum electrodes at an operating voltage of about 300 volts and to the low energy quantum electrodes at about 1000 volts to 1300 volts, it is desired to point out that this is merely illustrative and not by way of limitation as the voltage of the respective energies will vary in accordance with a number of conditions, including the length of the discharge desired, the pressure used, and the composition of the nitrogen-oxygen mixture being reacting. The operating voltage may be as high as 25,000 volts, but in a fairly good size reactor gap of at least semi-commercial exploitation the voltages of both energies supplied will vary normally from 5,000 to 10,000 volts, and in that case the gap between the electrodes may be in the neighborhood of 3″ to 10″. Here again these figures are merely illustrative and are set forth to indicate that the voltage may be varied over wide limits depending upon the conditions of operation.

While, as pointed out, it is preferably to operate at minimum sustaining energy, it is not desired to be definitely limited to the use of minimum sustaining energy. Some departure therefrom may be under certain circumstances desirable. When more than minimum sustaining electrical energy is used the excess is utilized largely in the production of heat, and this tends to decompose the nitrogen oxide produced.

It is well known that all sinusoidal waves have a definite well known energy content equivalent to $hf$, where $f$ is frequency and $h$ is known as Planck's constant, which is $6.554 \times 10^{-27}$ erg-seconds. It is also well know that the energy content of a wave train is proportional to the frequency $f$ and is equal to $hf$ erg-seconds, where $h$ is Planck's constant, and that, given the particular wave length employed, the energy content or the energy quanta thereof can be easily calculated. The energy content of a given wave length may be readily but cumbersomely expressed in ergs. This can be obtained from the following formula:

$$E(\text{ergs}) = hf = \frac{k}{\lambda}$$

where $$k = 1.967 \times 10^{-18}$$

and (1)

$h$=Planck's constant
$f$=Frequency
$\lambda$=Wave length in meters

Inasmuch as the energy content of a sinusoidal wave train or its energy quantum value is proportional to the frequency of the wave train, it is more convenient to express the energy in tetrms of "meg.-second" in which the energy quantum of a sinusoidal wave train of one megacycle frequency has an energy content of one meg.-second; and at a frequency of two megacycles the energy content is two meg.-seconds. One meg.-second of energy is then equivalent to $10^6 h$ or $6.554 \times 10^{-21}$ ergs.

In order to facilitate presentation and to simplify calculations wherein it is desired to point out and calculate the equivalency of cyclic energy expressed in terms of sinusoidal frequencies and in energies carried by electric impulses, it is proposed to define and name a new unit. The unit selected is that amount of energy existing in a wave train of pure sinusoidal type having a frequency of one megacycle i. e. having a wave length of 300 meters. This amount of energy will be referred to as "meg.-seconds" and is similar in nature and dimensions to the "erg-seconds," the difference being that the erg-seconds is an enormously larger unit. The meg.-second is $10^6 \times$Planck's constant. Inasmuch as the energy content of the wave train varies directly as the frequency and inversely as the wave length, it is plain that the frequency, expressed in mc., will also be the energy content expressed in terms of the new unit, meg.-seconds. The electrical impulses that are not sinusoidal in form can be expressed by equating their energy content in terms of meg.-seconds to the "equivalent frequency" or "equivalent wave length" of a sinusoidal wave. Therefore the impulses emanating from an electrical impulse generator may be described in terms of equivalent wave lengths so far as its energy characteristic is concerned. Employing the terminology above set forth, the energy contents of the impulse, regardless of whether the impulse is sinusoidal or non-sinusoidal in character, may be described in terms of its energy content measured by the new unit, which is hereinafter referred to and defined as the meg.-second of energy. In absolute terms, the meg.-second of energy is equal to $6.554 \times 10^{-21}$ ergs, said figure being derived by substituting 300 for $\lambda$ in Equation 1 or by multiplying Planck's constant by $10^6$.

While one of the crossed discharges may be generated by a low frequency current as, for example, 30 to 10,000 cycles per second, corresponding to energy quanta between $3 \times 10^{-5}$ and $1 \times 10^{-2}$ meg.-seconds; and the other of the crossed discharges generated by a high frequency current, as for example, that of radio frequency, or any cyclic current having a frequency above 250,000 cycles, corresponding to an energy quanta of 0.25 meg.-cycles or higher, it is preferred that each of the said electrical discharges be generated by separate cyclic electrical energy having a wave length or an energy quantum, as, for example, that generated by an impulse machine, capable of producing a substantially greater yield of nitrogen oxide, which, for convenience in discussion, may be termed the "peak" yield. The magnitude of the yield of nitrogen oxide at peak yield, which is dependent upon the particular energy quanta carried by the electrical discharge to which the nitrogen and oxygen mixture is subjected, being capable of being increased by carrying out the reaction for the production of nitrogen oxide in the presence of such electrodes, as will still further increase the magnitude of the yield of nitrogen oxide at the particular frequency or energy quanta used in carrying out the reaction.

Not only does tantalum exhibit a critical electrode series, but it is applicant's discovery that all of the elements exhibit a critical electrode series. This is not limited merely to so-called metals but elements such as hydrogen, helium, carbon, nitrogen, oxygen, fluorine, neon, and, in fact, as stated, all the elements of the periodic table exhibit a critical electrode series. Not all series are active for all media which are being electrochemically transformed. For example, in the production of nitrogen oxide using aluminum electrodes, only series 4 is active. As stated, in the production of hydrazine using tantalum only series 4 is active.

The critical electrode frequency of any element is the function of the atomic number of the element. Therefore, broadly, having determined the critical electrode series which was active for a given material and having determined the critical reaction frequency for the material, as for example, hydrazine, ozone, nitrogen oxide, and the like, the tools are available for operating at an optimum combined or resultant frequency where the yields will be higher than at other frequencies, and these yields may be increased by crossing said combined or optimum frequency with a second frequency of the character herein set forth. It is desired to point out that by crossing two separate cyclic electrical discharges of different energy quantum, the volume of the visible luminous discharge per unit of total energy supplied is greatly increased; that is, the energy density in watts per cubic centimeter is greatly decreased. Stated differently, the merged discharge has a larger volume than either discharge alone when supplied with energy equal to the total energy supplied to the crossed discharges.

The present application is a continuation-in-part of the following applications:

Serial No. 485,763, now abandoned, filed May 5, 1943; Serial No. 497,678, now abandoned, filed June 5, 1943; Serial No. 546,882, filed July 27, 1944; Serial No. 553,426, filed September 9, 1944 and Serial No. 779,561, filed October 13, 1947.

The method of producing nitrogen oxide utilizing certain critical gas reaction frequencies or certain critical gas reaction frequency bands is broadly claimed in applicant's co-pending application Serial No. 553,426, filed September 9, 1944. The oxidization of nitrogen broadly utilizing cross discharges is claimed in applicant's co-pending application Serial No. 546,882, filed July 27, 1944. Certain other limited processes herein disclosed are claimed in applicant's co-pending applications Serial Nos. 53,520, filed October 8, 1948, 99,815, filed June 17, 1949 and 99,816, filed June 17, 1949. Critical electrode frequencies are broadly set forth in co-pending application Serial No. 779,561, filed October 13, 1947.

Certain of the apparatus herein set forth is claimed in U. S. Patents Nos. 2,468,173, 2,468,174, 2,468,175, all granted April 26, 1949.

I claim:

1. The method of producing nitrogen oxide comprising introducing a gaseous medium consisting principally of oxygen gas and nitrogen gas into a gas discharge apparatus including a reactor provided with a plurality of spaced electrodes disposed therein to supply the reactor with a plurality of cyclic electrical discharges having different energy quanta, said electrodes containing as their essential activating constituent an electrically conducting tantalum material, and subjecting said gaseous medium in the presence of the activating tantalum electrodes to the action of a luminous cyclic electrical discharge produced by the intersecting and merging of at least two separate cyclic electrical discharge of different energy quantum, one of said discharges being generated by cyclic electrical energy having an energy quantum-content equivalent to a sinusoidal frequency between about 12 mc. (25 meters) and about 3.53 mc. (85 meters).

2. The method of producing nitrogen oxide comprising introducing a gaseous medium consisting principally of oxygen gas and nitrogen gas into a gas discharge apparatus including a reactor provided with a plurality of spaced electrodes disposed therein to supply the reactor with a plurality of cyclic electrical discharges having different energy quanta, said electrodes containing as their essential activating constituent an electrically conducting tantalum material, and subjecting said gaseous medium in the presence of the activating tantalum electrodes to the action of a luminous cyclic electrical discharge produced by the intersecting and merging of at least two separate cyclic electrical discharges of different energy quantum, one of said discharges being generated by cyclic electrical energy having an energy quantum-content equivalent to a sinusoidal frequency between about 12 mc. (25 meters) and about 3.53 mc. (85 meters), said discharges differing in energy quantum by at least 0.065 of the energy quantum present in a sinusoidal wave of 1 mc. frequency.

3. The method of producing nitrogen oxide comprising introducing a gaseous medium consisting principally of oxygen gas and nitrogen gas into a gas discharge apparatus including a reactor provided with a plurality of spaced electrodes disposed therein to supply the reactor with a plurality of cyclic electrical discharges having different energy quanta, said electrodes containing as their essential activating constituent an electrically conducting tantalum material, and subjecting said gaseous medium in the presence of the activating tantalum electrodes to the action of a luminous cyclic electrical discharge produced by the intersecting and merging of at least two separate cyclic electrical discharges of different energy quantum, one of said discharges being generated by cyclic electrical energy having an energy quantum-content equivalent to a sinusoidal frequency between about 10 mc. (30 meters) and about 3.75 mc. (80 meters).

4. The method of producing nitrogen oxide comprising introducing a gaseous medium consisting principally of oxygen gas and nitrogen gas into a gas discharge apparatus including a reactor provided with a plurality of spaced electrodes disposed therein to supply the reactor with a plurality of cyclic electrical discharges having different energy quanta, said electrodes containing as their essential activating constituent an electrically conducting tantalum material, and subjecting said gaseous medium in the presence of the activating tantalum electrodes to the action of a luminous cyclic electrical discharge produced by the intersection and merging of at least two separate cyclic electrical discharges of different energy quantum, one of said discharges being generated by cyclic electrical energy having an energy quantum-content equivalent to a sinusoidal frequency between about 10 mc. (30 meters) and about 3.75 mc. (80 meters), said discharges differing in energy quantum by at least 0.065 of the energy quantum present in a sinusoidal wave of 1 mc. frequency.

5. The method of producing nitrogen oxide comprising introducing a gaseous medium consisting principally of oxygen gas and nitrogen gas into a gas discharge apparatus including a reactor provided with a plurality of spaced electrodes disposed therein to supply the reactor with a plurality of cyclic electrical discharges having different energy quanta, said electrodes containing as their essential activating constituent an electrically conducting tantalum material, and subjecting said gaseous medium in the presence of the activating tantalum electrodes to the action of a luminous cyclic electrical discharge produced by the intersection and merging of at least two separate cyclic electrical discharges of different energy quantum, one of said discharges being generated by cyclic electrical energy having an energy quantum-content equivalent to a sinusoidal frequency between about 6 mc. (50 meters) and about 5.45 mc. (55 meters).

6. The method of producing nitrogen oxide comprising introducing a gaseous medium consisting principally of oxygen gas and nitrogen gas into a gas discharge apparatus including a reactor provided with a plurality of spaced electrodes disposed therein to supply the reactor with a plurality of cyclic electrical discharges having different energy quanta, said electrodes containing as their essential activating constituent an electrically conducting tantalum material, and subjecting said gaseous medium in the presence of the activating tantalum electrodes to the action of a luminous cyclic electrical discharge produced by the intersection and merging of at least two separate cyclic electrical discharges of different energy quantum, one of said discharges being generated by cyclic electrical energy having an energy quantum-content equivalent to a sinusoidal frequency between about 6 mc. (50 meters) and about 5.45 mc. (55 meters), said discharges differing in energy quantum by at least 0.065 of the energy quantum present in a sinusoidal wave of 1 mc. frequency.

7. The method of producing nitrogen oxide comprising introducing a gaseous medium consisting principally of oxygen gas and nitrogen gas into a gas discharge apparatus including a reactor provided with a plurality of spaced electrodes disposed therein to supply the reactor with a plurality of cyclic electrical discharges having different energy quanta, said electrodes containing as their essential activating constituent an electrically conducting tantalum material, and subjecting said gaseous medium in the presence of the activating tantalum electrodes to the action of a luminous cyclic electrical discharge produced by the intersection and merging of at least two separate cyclic electrical discharges of different energy quantum while simultaneously inhibiting the decomposition of the nitrogen oxide formed in the gas discharge apparatus by keeping the temperature of the gas discharge apparatus below about 400° C., one of said discharges being generated by cyclic electrical energy having an energy quantum-content equivalent to a sinusoidal frequency between about 12 mc. (25 meters) and about 3.53 mc. (85 meters).

8. The method of producing nitrogen oxide comprising introducing a gaseous medium consisting principally of oxygen gas and nitrogen gas into a gas discharge apparatus including a reactor provided with a plurality of spaced electrodes disposed therein to supply the reactor with a plurality of cyclic electrical discharges having different energy quanta, said electrodes containing as their essential activating constituent an electrically conducting tantalum material, and subjecting said gaseous medium in the presence of the activating tantalum electrodes to the action of a luminous cyclic electrical discharge produced by the intersection and merging of at least two separate cyclic electrical discharges of different energy quantum while simultaneously inhibiting the decomposition of the nitrogen oxide formed in the gas discharge apparatus by keeping the temperature of the gas discharge apparatus below about 400° C., one of said discharges being generated by cyclic electrical energy having an energy quantum-content equivalent to a sinusoidal frequency between about 12 mc. (25 meters) and about 3.53 mc. (85 meters), said discharges differing in energy quantum by at least 0.2 of the energy quantum present in a sinusoidal wave of 1 mc. frequency.

9. The method of producing nitrogen oxide comprising introducing a gaseous medium consisting principally of oxygen gas and nitrogen gas into a gas discharge apparatus including a reactor provided with a plurality of spaced electrodes disposed therein to supply the reactor with a plurality of cyclic electrical discharges having different energy quanta, said electrodes containing as their essential activating constituent an electrically conducting tantalum material, and subjecting said gaseous medium in the presence of the activating tantalum electrodes to the action of a luminous cyclic electrical discharge produced by the intersection and merging of at least two separate cyclic electric discharges of different energy quantum, one of said discharges being generated by cyclic electrical energy having an energy quantum content equivalent to a sinusoidal frequency between about 12 mc. (25 meters) and about 3.53 mc. (85 meters), and another of said discharges being generated by cyclic energy having an energy quantum content equivalent to a sinusoidal frequency between about 10 cycles (30,000,000 meters) and about 10,000 cycles (30,000 meters).

10. The method of producing nitrogen oxide comprising introducing a gaseous medium consisting principally of oxygen gas and nitrogen gas into a gas discharge apparatus including a reactor provided with a plurality of spaced electrodes disposed therein to supply the reactor with a plurality of cyclic electrical discharges having different energy quanta, said electrodes containing as their essential activating constituent an electrically conducting tantalum material, and subjecting said gaseous medium in the presence of the activating tantalum electrodes to the action of a luminous cyclic electrical discharge produced by the intersection and merging of at least two separate cyclic electrical discharges of different energy quantum, one of said discharges being generated by cyclic electrical energy having an energy quantum content equivalent to a sinusoidal frequency between about 12 mc. (25 meters) and about 3.53 mc. (85 meters), and another of said discharges being generated by cyclic energy having an energy quantum-content equivalent to a sinusoidal frequency between about 10 cycles (30,000,000 meters) and 500,000 cycles (600 meters).

11. The method set forth in claim 1 wherein the oxygen-and-nitrogen-containing gaseous medium is electrochemically transformed utilizing substantially minimum sustaining energy.

12. The method set forth in claim 2 in which the larger energy component comprises at least 4% of the total energy supplied to the discharge.

13. The method set forth in claim 2 in which the larger energy component comprises at least 4% of the total energy supplied to the discharge, and the electrochemical transformation of the oxygen-and-nitrogen-containing gaseous medium is effected utilizing substantially minimum sustaining energy.

14. The method set forth in claim 1 in which the volume of the merged luminous discharge is larger than the volume of either intersecting discharge alone when the energy to generate either of said intersecting discharges is equal to the total energy supplied to the intersecting discharges.

15. The method set forth in claim 2 wherein the emanating discharges are positioned one to the other at an angle between about 45° and about 90°.

16. The method set forth in claim 2 in which the electrochemical transformation of the oxygen-and-nitrogen-containing gaseous medium is effected at a pressure of less than one atmosphere.

17. The method set forth in claim 6 in which the larger energy component comprises at least 4% of the total energy supplied to the discharge, and the electrochemical transformation of the oxygen-and-nitrogen-containing gaseous medium is effected utilizing substantially minimum sustaining energy.

18. The method set forth in claim 6 in which the larger energy component comprises at least 4% of the total energy supplied to the discharge and the electrochemical transformation is effected under a pressure less than one atmosphere and utilizing substantially minimum sustaining energy.

19. The method of producing nitrogen oxide comprising introducing a gaseous medium consisting principally of oxygen gas and nitrogen gas into a gas discharge apparatus provided with a plurality of spaced electrically conducting metallic tantalum-containing electrodes in which tantalum predominates, and subjecting said gaseous medium to the action of a cyclic electrical discharge which is generated by cyclic electrical energy having an energy quantum equivalent to a sinusoidal frequency selected from the following group of frequencies and frequency ranges: between about 8.82 mc. (34 meters) and about 7.50 mc. (40 meters); between about 4.54 mc. (66 meters) and about 3.95 mc. (76 meters); between about 3.06 mc. (98 meters) and about 2.91 mc. (103 meters); between about 1.80 mc. (167 meters) and about 1.74 mc. (172 meters); between about 1.07 mc. (280 meters) and about 1.01 mc. (296 meters); about 0.983 mc. (305 meters); between about 0.531 mc. (565 meters) and about 0.517 mc. (580 meters); and about 0.268 mc. (1119 meters).

20. The method of producing nitrogen oxide comprising introducing a gaseous medium consisting principally of oxygen gas and nitrogen gas into a gas discharge apparatus provided with a plurality of spaced electrically conducting metallic tantalum-containing electrodes in which tantalum predominates, and subjecting said gaseous medium to the action of a cyclic electrical discharge which is generated by cyclic electrical energy having an energy quantum equivalent to a sinusoidal frequency between about 8.82 mc. (34 meters) and about 7.50 mc. (40 meters).

21. The method of producing nitrogen oxide comprising introducing a gaseous medium consisting principally of oxygen gas and nitrogen gas into a gas discharge apparatus provided with a plurality of spaced electrically conducting metallic tantalum-containing electrodes in which tantalum predominates, and subjecting said gaseous medium to the action of a cyclic electrical discharge which is generated by cyclic electrical energy having an energy quantum equivalent to a sinusoidal frequency between about 4.54 mc. (66 meters) and about 3.95 mc. (76 meters).

22. The method of producing nitrogen oxide comprising introducing a gaseous medium consisting principally of oxygen gas and nitrogen gas into a gas discharge apparatus provided with a plurality of spaced electrically conducting metallic tantalum-containing electrodes in which tantalum predominates, and subjecting said gaseous medium to the action of a cyclic electrical discharge which is generated by cyclic electrical energy having an energy quantum equivalent to a sinusoidal frequency between about 1.80 mc. (167 meters) and about 1.74 mc. (172 meters).

23. The method defined in claim 19 in which the reaction is effected at less than atmospheric pressure.

24. The method of claim 20 in which the reaction is effected at less than atmospheric pressure.

25. The method of producing nitrogen oxide comprising introducing a gaseous medium consisting principally of oxygen gas and nitrogen gas into a gas discharge apparatus including a reactor, said apparatus being provided with a plurality of spaced metallic electrodes disposed therein to supply the reactor with a plurality of cyclic electrical discharges having different energy quanta, said electrodes containing as their essential activating constituent an electrically conducting tantalum-containing material in which tantalum predominates, and subjecting said gaseous medium to the action of a cyclic electrical discharge produced by the intersecting and merging of at least two separate cyclic electrical discharges of different energy quantum, one of said discharges being generated by a cyclic energy quantum equivalent to a sinusoidal frequency selected from the following groups of frequencies and frequency ranges: between about 8.82 mc. (34 meters) and about 7.50 mc. (40 meters); between about 4.54 mc. (66 meters) and about 3.95 mc. (76 meters); between about 3.06 mc. (98 meters) and about 2.91 mc. (103 meters); between about 1.80 mc. (167 meters) and about 1.74 mc. (172 meters); between about 1.07 mc. (280 meters) and about 1.01 mc. (296 meters); about 0.983 mc. (305 meters); between about 0.531 mc. (565 meters) and about 0.517 mc. (580 meters); and about 0.268 mc. (1119 meters).

26. The method of producing nitrogen oxide comprising introducing a gaseous medium consisting principally of oxygen gas and nitrogen gas into a gas discharge apparatus including a reactor, said apparatus being provided with a plurality of spaced metallic electrodes disposed therein to supply the reactor with a plurality of cyclic electrical discharges having different energy quanta, said electrodes containing as their essential activating constituent an electrically conducting tantalum-containing material in which tantalum predominates, and subjecting said gaseous medium to the action of a cyclic electrical discharge produced by the intersecting and merging of at least two separate cyclic electrical discharges of different energy quantum, one of said discharges being generated by a cyclic energy quantum equivalent to a sinusoidal frequency selected from the following groups of frequencies and frequency ranges: between about 8.82 mc. (34 meters) and about 7.50 mc. (40 meters); between about 4.54 mc. (66 meters) and about 3.95 mc. (76 meters); between about 3.06 mc. (98 meters) and about 2.91 mc. (103 meters); between about 1.80 mc. (167 meters) and about 1.74 mc. (172 meters); between about 1.07 mc. (280 meters) and about 1.01 mc. (296 meters); about 0.983 mc. (305 meters); between about 0.531 mc. (565 meters) and about 0.517 mc. (580 meters); and about 0.268 mc. (1119 meters), said discharges differing in energy quantum by at least 0.065 of the energy quantum present in a sinusoidal wave of 1 mc. frequency.

27. The method of producing nitrogen oxide comprising introducing a gaseous medium consisting principally of oxygen gas and nitrogen gas into a gas discharge apparatus provided with a plurality of spaced electrically conducting metallic tantalum-containing electrodes in which tantalum predominates, and subjecting said gaseous medium to the action of a cyclic electrical discharge which is generated by cyclic electrical energy having an energy quantum equivalent to a sinusoidal frequency selected from the following group of frequencies and frequency ranges: between about 8.82 mc. (34 meters) and about 7.50 mc. (40 meters); between about 4.54 mc. (66 meters) and about 3.95 mc. (76 meters); between about 3.06 mc. (98 meters) and about 2.91 mc. (103 meters); between about 1.80 mc. (167 meters) and about 1.74 mc. (172 meters); between about 1.07 mc. (280 meters) and about 1.01 mc. (296 meters); about 0.983 mc. (305 meters); between about 0.531 mc. (565 meters) and about 0.517 mc. (580 meters); and about 0.268 mc. (1119 meters), the total amount of energy contributed by the larger energy component being at least 4% of the total energy supplied to the discharge.

28. The method defined in claim 27 in which the electrochemical transformation of the oxygen-and-nitrogen-containing gaseous medium is effected utilizing substantially minimum sustaining energy.

29. The method of producing nitrogen oxide comprising introducing a gaseous medium consisting principally of oxygen gas and nitrogen gas into a gas discharge apparatus including a reactor, said apparatus being provided with a plurality of spced metallic electrodes disposed therein to supply the reactor with a plurality of cyclic electrical discharges having different energy quanta, said electrodes containing as their essential activating constituent an electrically conducting tantalum-containing material in which tantalum predominates, and subjecting said gaseous medium, while under a pressure between about 150 and about 725 mm. of mercury, to the action of a cyclic electrical discharge produced by the intersecting and merging of at least two separate cyclic electrical discharges of different energy quantum, each of said discharges emanating from a separate electrode, one of said discharges being generated by a cyclic energy quantum equivalent to a sinusoidal frequency between about 10 cycles (30,000,000 meters) and 60 cycles (5,000,000 meters), and the other discharge being generated by cyclic electrical energy quantum equivalent to a sinusoidal frequency between about 12 mc. (25 meters) and about 1.71 mc. (175 meters).

WILLIAM J. COTTON.

REFERENCES CITED

The following references are of record in the file of this patent:

UNITED STATES PATENTS

| Number | Name | Date |
|---|---|---|
| 777,991 | Werner | Dec. 20, 1904 |
| 1,055,003 | Wagener | Mar. 4, 1913 |
| 1,317,705 | Island | Oct. 7, 1919 |
| 1,458,525 | Daniels | June 12, 1923 |

FOREIGN PATENTS

| Number | Country | Date |
|---|---|---|
| 184,871 | Switzerland | Sept. 1, 1936 |

OTHER REFERENCES

Comptes Rendus (Doklady), de l'Academie des Sciences de l'U. R. S. S., 1938; volume 18, No. 6, pp. 329–332; volume 20, No. 4, pp. 297–300.

Helvetica Chemica Acta, volume 19, 1938, pp. 291, 292, 293, 301, 302, 307.